(12) United States Patent
Miller

(10) Patent No.: US 10,252,627 B2
(45) Date of Patent: Apr. 9, 2019

(54) ON BOARD CHARGER INPUT CURRENT LIMIT SETTING BASED ON AC INPUT CIRCUIT VOLTAGE RESPONSE

(71) Applicants: Hyundai America Technical Center, Inc., Superior Township, MI (US); Hyundai Motor Company, Seoul (KR); Kia Motors Corporation, Seoul (KR)

(72) Inventor: Ryan Miller, Chino, CA (US)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 122 days.

(21) Appl. No.: 15/457,160

(22) Filed: Mar. 13, 2017

(65) Prior Publication Data

US 2018/0257495 A1    Sep. 13, 2018

(51) Int. Cl.
*H02J 7/14* (2006.01)
*B60L 11/18* (2006.01)

(52) U.S. Cl.
CPC ....... *B60L 11/1812* (2013.01); *B60L 11/1825* (2013.01); *B60L 11/1861* (2013.01); *B60L 2210/40* (2013.01); *Y02T 10/7005* (2013.01); *Y02T 10/7088* (2013.01); *Y02T 90/16* (2013.01)

(58) Field of Classification Search
CPC ....................................................... H02J 7/007
USPC ............................................................ 320/104
See application file for complete search history.

(56) References Cited

U.S. PATENT DOCUMENTS

| | | | |
|---|---|---|---|
| 8,633,678 B2 | 1/2014 | Yegin et al. | |
| 8,710,796 B2 | 4/2014 | Muller et al. | |
| 2012/0287542 A1 | 11/2012 | Bianco | |
| 2015/0256016 A1* | 9/2015 | Wang | H01M 10/44 320/162 |

* cited by examiner

*Primary Examiner* — Edward Tso
*Assistant Examiner* — Ahmed H Omar
(74) *Attorney, Agent, or Firm* — Brinks Gilson & Lione (57) ABSTRACT

This disclosure relates to the field of electric vehicles (EV) that run, at least in part, on an electric motor. Included on the EV is an on board charger (OBC) responsible for charging a battery supply based on electronic power received from a source. The OBC is configured to detect certain voltage or current characteristics during a charging operation of the battery supply, and adjust allowed operational limits for the OBC accordingly.

18 Claims, 5 Drawing Sheets

ON BOARD CHARGER INPUT CURRENT LIMIT SETTING BASED ON AC INPUT CIRCUIT VOLTAGE RESPONSE

TECHNICAL FIELD

This disclosure relates to the field of electric vehicles (EV) that run, at least in part, on an electric motor. Included on the EV is an on board charger (OBC) responsible for charging a battery supply based on electronic power received from a source. The OBC is configured to detect certain voltage or current characteristics during a charging operation of the battery supply, and adjust allowed operational limits for the OBC accordingly.

BACKGROUND

When a vehicle's OBC draws the maximum current of the EVSE under faulty AC outlet circuit conditions it may cause the circuit breaker to trip, or cause other undesirable conditions.

EV charging is the primary function of the OBC which takes AC input from a source (e.g., home, building, generator, or other source of power) and converts it to DC output to charge a high voltage battery (HV battery) on board the EV for powering the electric motor. To do this safely in current applications the OBC receives a maximum current limit signal from an Electric Vehicle Supply Equipment (EVSE) as defined, for example, in SAE J1772. SAE J1772 is a standard for electrical connectors for EVs followed in North America, and describes the standards for the physical plug layout of the electrical connectors, electrical characteristics including performance requirements (e.g., charging currents and maximum current limits during a charging operation), and communication protocols transferred through the electrical connectors. In certain scenarios where the source is a DC source, the OBC may work together with the EVSE to achieve charging of the HV battery.

Although the OBC may be supplied with a maximum current limit from the EVSE, preventing the OBC from reaching the maximum current limit may still be desired.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

The discussion below makes reference to an electric vehicle (EV) battery charging system that may include portions of an on board charger (OBC), as well as other components of an EV such as a battery supply, electric motor, re-charging circuits, and/or other electronic components coupled to an EV's controller area network bus (CAN bus). The EV battery charging system may also include an electric vehicle charging station (e.g., electric vehicle supply equipment (EVSE)) that acts as an intermediary between a power source and the OBC installed on the EV.

Figure 1:
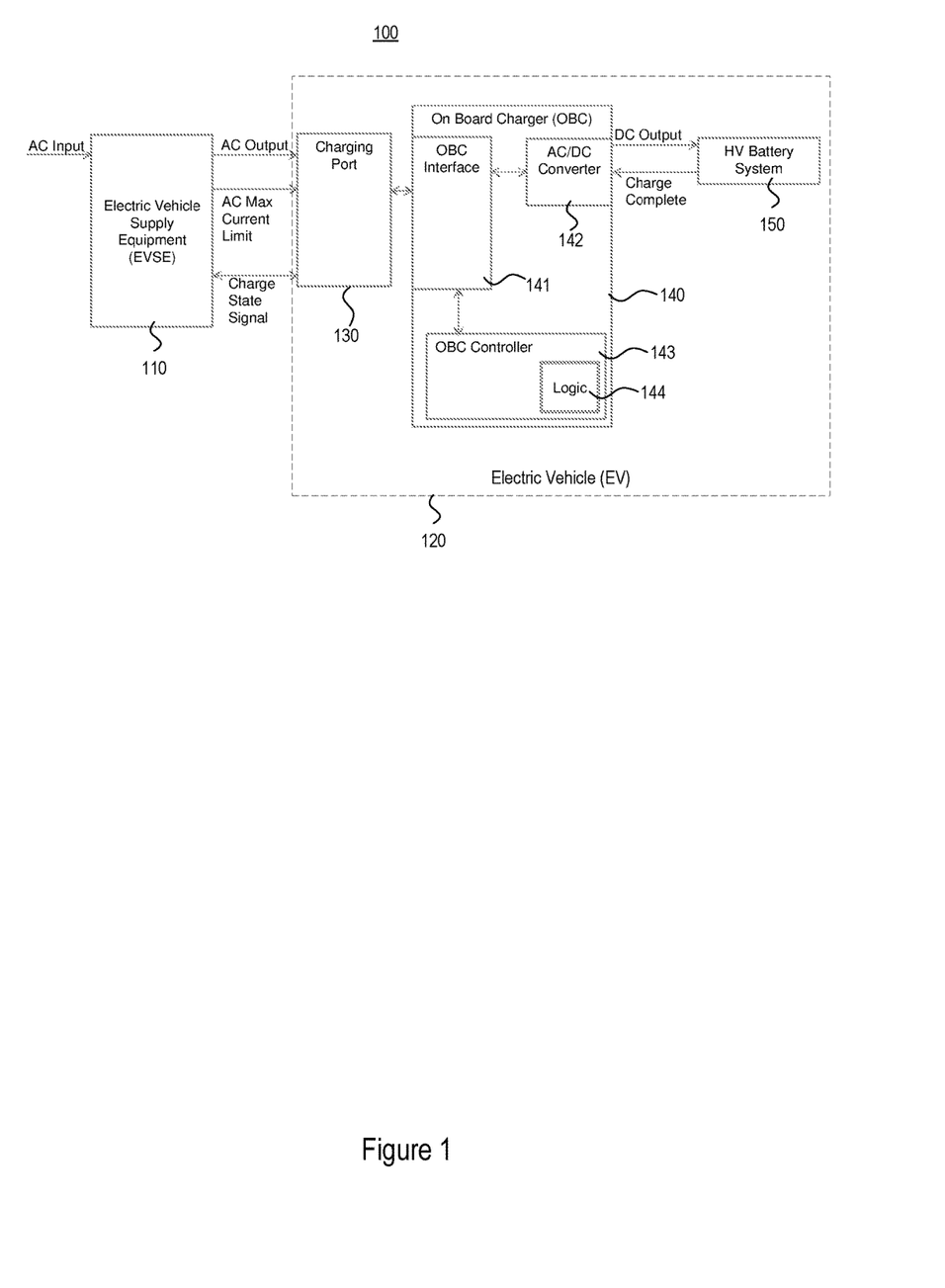
FIG. 1 shows an exemplary block diagram of an electric vehicle charging system.

An important goal for an EV is to accomplish robust and consistent charging so that a driver does not find themselves stranded without power to further operate their EV. FIG. 1 shows an exemplary EV charging system 100 for achieving robust and consistent charging. The EV charging system 100 includes an EVSE 110 and components of an EV 120, where the EVSE receives an AC input power from a power source (e.g., local power grid), and provides the AC input power to the EV 120.

The EVSE 110 may include a charging connector configured to connect to the EV's charging port 130 and provide an AC output power received by the EV 120 through the charging port 130. The charging connector on the EVSE 110 and the charging port 130 on the EV 120 may be compatible according to a known standard such as SAE J1772, or other EV charging standard. The EVSE 110 may additionally provide information to the EV 120 through a pin in the charging connector, such as an AC maximum current limit information and a charge state signal (e.g., Level 1, 2, or DC direct charging). The EVSE 110 may additionally receive information from the EV 120 through a pin in the charging connector, such as a charge state signal that identifies a current charging state (e.g., percentage charged of the battery supply, start charging state, charge completion state, charging state).

The charging port 130 included on the EV 120 receives the AC output power from the EVSE 110, as well as any other information provided by the EVSE 110 such as the AC max current limit and the charge state signal. The AC output power received by the charging port 130 may then be transmitted to the OBC 140 for charging a high voltage (HV) battery system 150. The OBC 140 may include an OBC interface for receiving the AC output power from the charging port 130, and an AC/DC converter for converting the AC output power to a DC output power. The DC output power may be transmitted to the HV battery system 150 to charge a HV battery included in the HV battery system 150. The HV battery system 150 may include the HV battery, a re-charging system, as well as operational circuitry, hardware, and/or software for controlling portions of the HV battery system 150. When the HV battery is fully charged, the HV battery system 150 may transmit a charge complete signal to the OBC 140. The HV battery system 150 may also intermittently transmit a charge completion status to the OBC 140 identifying a level of battery charge on the HV battery.

The OBC 140 may further include an OBC controller 143 that includes operational circuitry, hardware, and/or software for controlling operation of the OBC 140. The logic 144 installed on the OBC 140 is representative of instructions stored on a memory that may be executed by a processor of the OBC 140 to implement one or more of the operational processes attributed to the OBC 140 as described herein.

Figure 2:
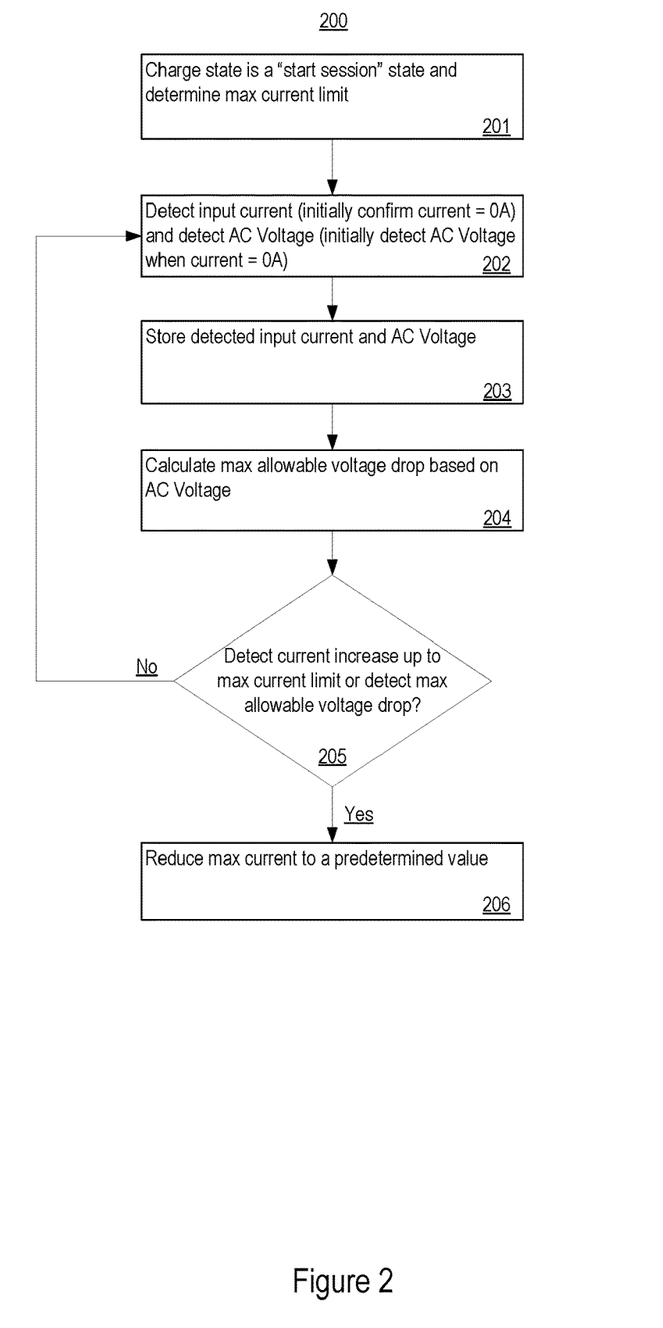
FIG. 2 shows a flow chart of logic describing an exemplary process for operating a charging operation for an electric vehicle.

FIG. 2 shows a flow chart 200 of logic describing a process for adjusting a maximum current through an on board charger during a charging operation of a HV battery installed on an electric vehicle. The on board charger referenced in the flow chart 200 may be represented by the OBC 140 and the electric vehicle referenced in the flow chart 200 may be represented by the EV 120 described in FIG. 1.

The on board charger may initially determine a current charging state to be a start session state prior to the charging of the HV battery (201). A maximum input current value may also be determined by either receiving maximum input current value information from an electric vehicle supply equipment (e.g., EVSE 110) connected to the electric vehicle, or by accessing a predetermined maximum input current value stored on a memory of the on board charger (201).

During the start session state, the on board charger may detect an input current and an input voltage of a power signal received from, for example, the electric vehicle supply equipment (e.g., EVSE 110). During the start session state, the input current and the input voltage detected by the on board charger will be at a minimum (e.g., at or near 0 A and 0 V), respectively (202).

The detected input current and the input voltage is stored within an on board memory of the on board charger, or other memory in communication with the on board charger (203).

A maximum allowable voltage drop is calculated based on the input voltage (204). The maximum allowable voltage drop may be calculated based on known recommended voltage drop calculations that range from 3-5%, where calculated voltage drops greater than the recommended voltage drop in the 3-5% range may be an indication of an improper or faulty wiring.

Following the start to an active charging operation by the on board charger, the input current and input voltage supplied from the EVSE 110 may continue to be monitored. The on board charger may determine whether the detected input current has increased to reach, or go above, the maximum input current value (205). The on board charger may also determine whether a voltage drop in the detected input voltage drops below the maximum allowable voltage drop (205).

When the detected input current is determined to reach the maximum input current value or the voltage drop is determined to drop below the maximum allowable voltage drop, the on board charger may reduce the maximum input current value (206). By reducing the maximum input current value, the current flowing through the on board charger will be reduced, which in turn reduces the undesirable strain on the AC input circuit upstream of the EVSE 110 as well as components of the on board charger's circuitry and hardware.

The reduction to the maximum input current may be accomplished on the OBC 140 by adjusting the maximum input current value to the lower value and adjusting electronic component characteristics on the OBC 140 to reduce the current flowing through the OBC 140 to be below the adjusted lower maximum input current value. This way, the EVSE 110 may communicate the maximum current limit to the OBC 110, and then the OBC 140 may adjust the current accordingly.

In addition or alternatively, the reduction to the maximum input current may be accomplished on the EVSE 110 by adjusting the maximum input current value to the lower value and adjusting the electronic component characteristics on the EVSE 110 to reduce the current flowing through the EVSE 110 to be below the adjusted lower maximum input current value. This way, the current supplied by the EVSE 110 to the OBC 140 will have an AC current that is lower than the adjusted lower maximum input current. The EVSE 110 may receive instructions for lowering the maximum input current value from the OBC 140, power source (e.g., smart grid feedback to the EVSE 110), or other control device such as a home automation/load reduction system. The instructions may be communicated via existing wiring between the EVSE 110 and OBC 140, or wireless via known wireless communication protocols such as WiFi or cellular network communication.

When the detected input current is determined not to reach the maximum input current value and the voltage drop is determined not to drop below the maximum allowable voltage drop, the on board charger may continue to monitor the input current and input voltage being received by the on board charger (202).

Figure 3:
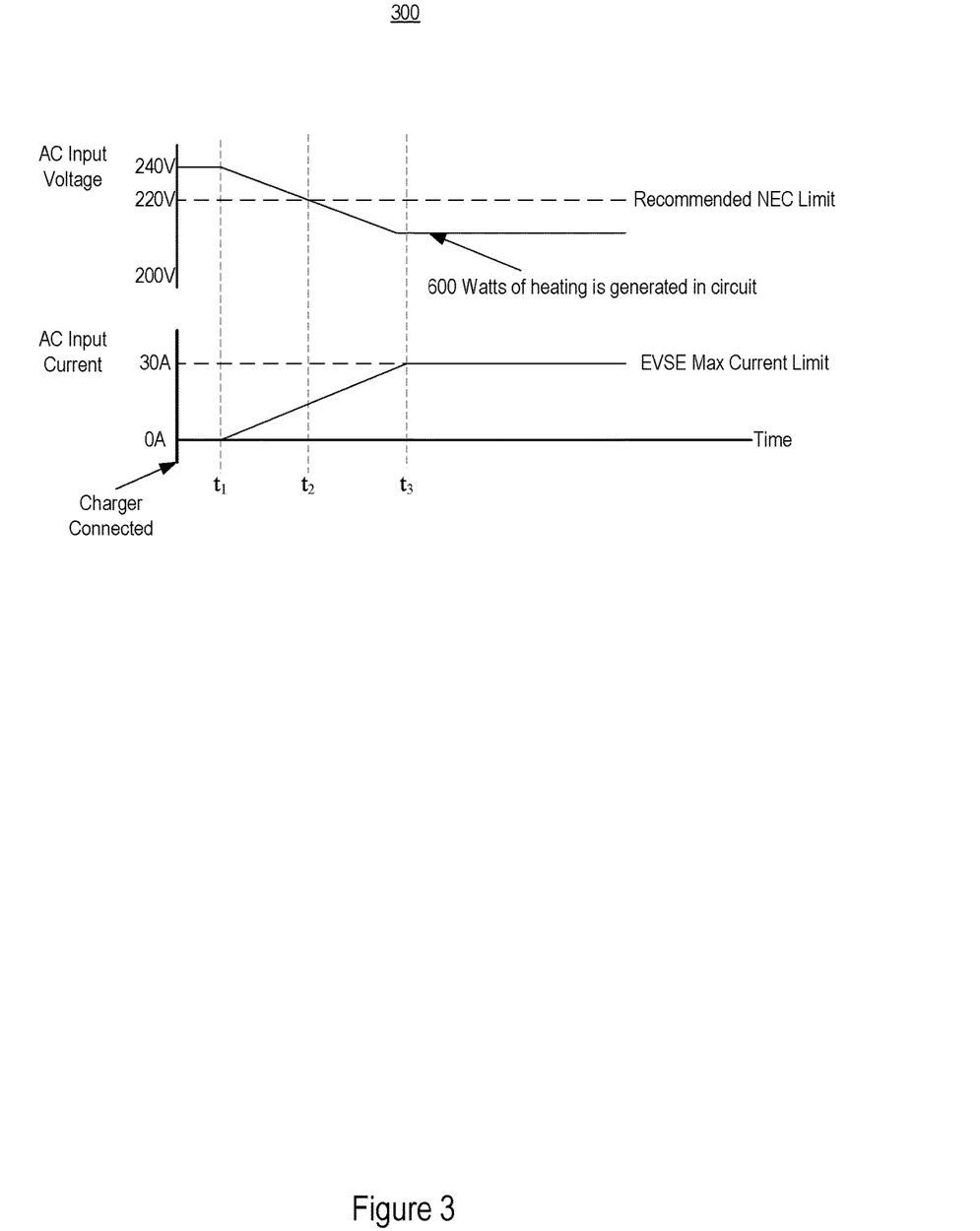
FIG. 3 shows a time chart graph describing an exemplary charging operation without adjusting a maximum current limit.

FIG. 3 shows a time chart graph 300 describing an exemplary charging operation implemented by the OBC 140 that does not include adjusting a maximum current limit. The top graph plots an AC input voltage against a period of time. The bottom graph plots an AC input current against the same period of time. Both the AC input voltage and the AC input current is representative of the input current and input voltage being received by the OBC 140.

The AC input voltage is initially seen to be flat at 240 V for an initial time period that lasts until $t_1$ (e.g., start session stage). The AC input current is initially seen to be flat at 0 A for the same initial time period that lasts until $t_1$. Following the initial time period, the AC input voltage decreases continually until the AC input current reaches a maximum current limit at $t_3$. By the time the maximum current limit is reached at $t_3$, the AC input voltage drop has gone down below the recommend limit (e.g., National Electric Code (NEC) recommended maximum voltage drop limit ranging from 3-5%) that would have been reached at $t_2$.

By allowing the OBC 140 to continue operating until the AC input current reaches the maximum current limit, the strain exerted on the circuitry and hardware upstream of the OBC 140 may be excessive (e.g., 600 Watts of power generated by $t_3$). At a minimum, allowing the AC input current to reach the maximum current limit may result in a circuit breaker on the OBC 140 to be triggered, which would result in a cessation of operation of the OBC 140.

Figure 4:
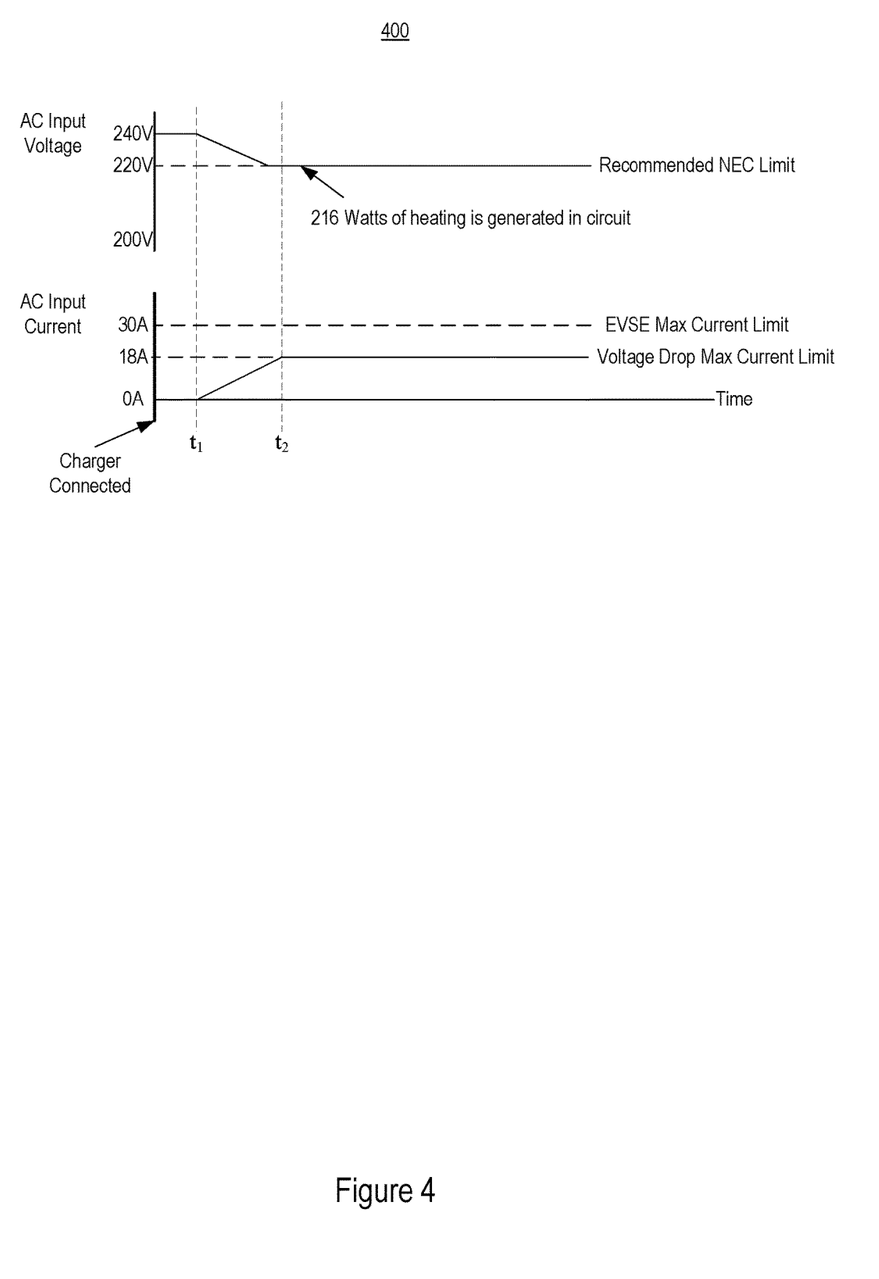
FIG. 4 shows a time chart graph describing an exemplary charging operation with adjusting a maximum current limit.

FIG. 4 shows a time chart graph 400 describing an exemplary charging operation implemented by the OBC 140 that include adjusting a maximum current limit. The top graph plots an AC input voltage against a period of time. The bottom graph plots an AC input current against the same period of time. Both the AC input voltage and the AC input current is representative of the input current and input voltage being received by the OBC 140.

The AC input voltage is initially seen to be flat at 240 V for an initial time period that lasts until $t_1$ (e.g., start session stage). The AC input current is initially seen to be flat at 0 A for the same initial time period that lasts until $t_1$. Following the initial time period, the AC input voltage decreases continually until the voltage drop detected for the AC input voltage reaches a recommended maximum voltage drop limit (e.g., National Electric Code (NEC) recommended maximum voltage drop limit ranging from 3-5%) at $t_2$. When the voltage drop is determined to reach the recommended maximum voltage drop limit at $t_2$, the OBC 140 reacts by lowering the maximum current limit to a lower predetermined maximum current limit.

By lowering the maximum current limit based on the determination that the voltage drop of the AC input voltage has reached the recommended maximum voltage drop limit, the power generated through the circuitry and hardware of the OBC 140 is much lower than if the AC input current were allowed to increase up to the original maximum current limit (e.g., 600 Watts under maintaining the maximum input current versus 216 Watts under adjusting the maximum current limit to a lower value). Thus, the monitoring of the AC input voltage to determine whether a maximum voltage drop limit has been reached by the OBC 140 offers a unique and efficient solution for saving the circuitry and hardware upstream of the OBC 140 from excessive strain. This solution also saves the OBC 140 from triggering a circuit breaker that would result in a cessation of operation of the OBC 140.

Figure 5:
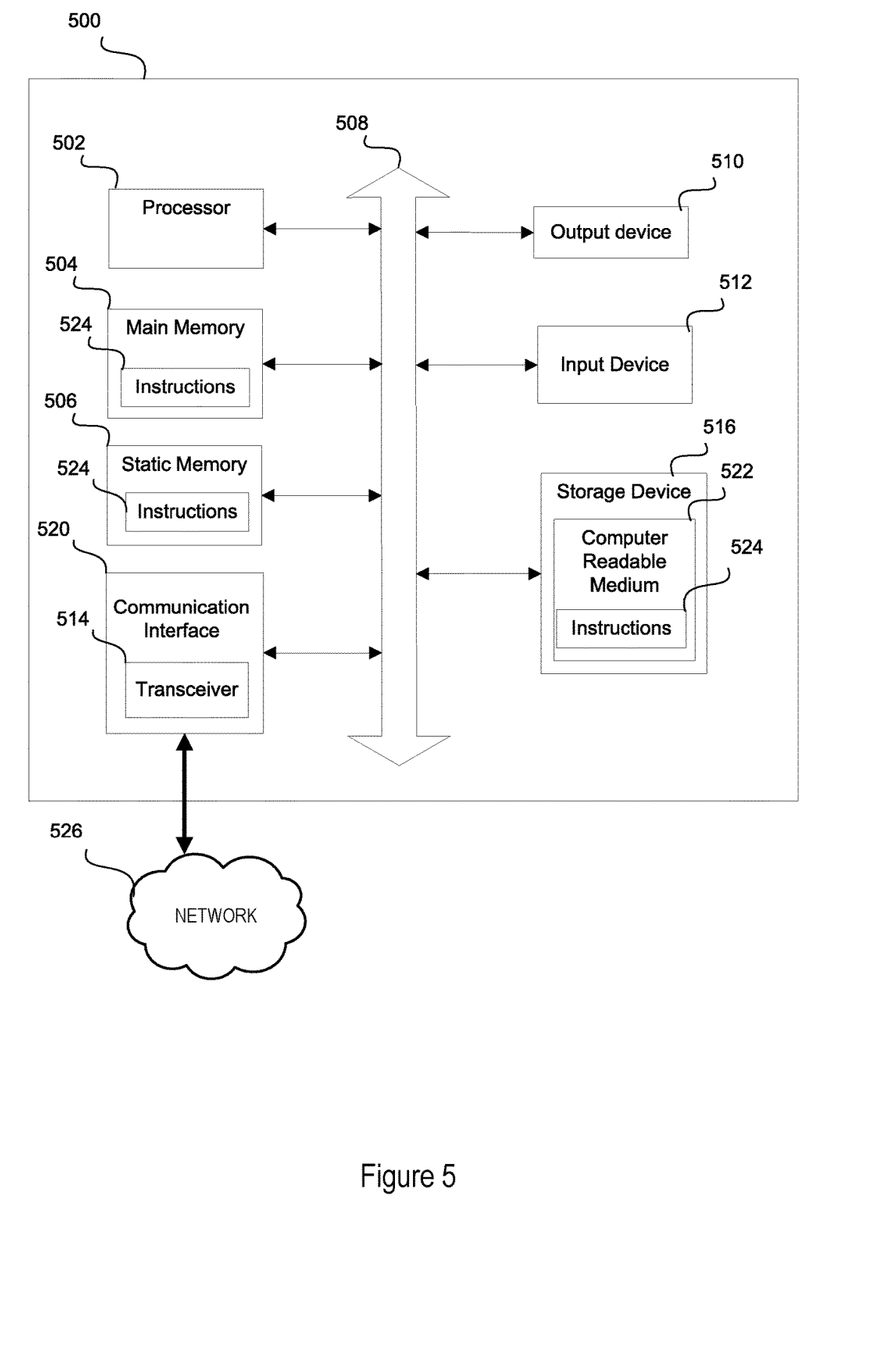
FIG. 5 shows exemplary computer architecture for a computer system included in an electric vehicle.

One or more of the devices in the EV charging system 100 may include one or more components described by the exemplary computer architecture of computer system 500 shown in FIG. 5. For example, the computer system 500 may be representative of the OBC 140, or a computer system in communication with the OBC 140 via CAN bus of the EV 120.

Computer system 500 includes a communication interface 520 that allows for communication with other devices. For example, the communication interface 520 may be representative of the OBC interface 141 or charging port 130 configured to receive power, as well as information, from the EVSE 110. According to some embodiments, the communication interface may enable wireless communication via a network 526. Network 526 may be any suitable network and may support any appropriate protocol suitable for communication to computer system 500. The computer system 500 may also include a processor 502, a main memory 504, a static memory 506, an output device 510 (e.g., a display or speaker), an input device 512, and a storage device 516, communicating via a bus 508 (e.g., CAN bus).

Processor 502 represents a central processing unit. Processor 502 executes instructions 524 stored on one or more of the main memory 504, static memory 506, or storage device 516. Processor 502 may also include portions of the computer system 500 that control the operation of the entire computer system 500. Processor 502 may also represent a controller that organizes data and program storage in memory and transfers data and other information between the various parts of the computer system 500.

Processor 502 is configured to receive input data and/or user commands through input device 512. Input device 512 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 500 and control operation of computer system 500. Input device 512 as illustrated in FIG. 5 may be representative of any number and type of input devices.

Processor 502 may also communicate with other computer systems via network 526 to receive instructions 524 or other information, where processor 502 may control the storage of such instructions 524 or information into any one or more of the main memory 504 (e.g., random access memory (RAM)), static memory 506 (e.g., read only memory (ROM)), or the storage device 516. Processor 502 may then read and execute instructions 524 from any one or more of the main memory 504, static memory 506, or storage device 516. The instructions 524 may also be stored onto any one or more of the main memory 504, static memory 506, or storage device 516 through other sources. The instructions 524 may correspond to, for example, the logic 144 described as being included in the OBC controller 143.

Although computer system 500 is represented in FIG. 5 as a single processor 502 and a single bus 508, the disclosed embodiments applies equally to computer systems that may have multiple processors and to computer systems that may have multiple busses with some or all performing different functions in different ways.

Storage device 516 represents one or more mechanisms for storing data. For example, storage device 516 may include a computer readable medium 522 such as read-only memory (ROM), RAM, non-volatile storage media, optical storage media, flash memory devices, and/or other machine-readable media, or any other appropriate type of storage device.

Output device 510 is configured to present information to a user. For example, output device 510 may be a display such as a liquid crystal display (LCD), a gas or plasma-based flat-panel display, or a traditional cathode-ray tube (CRT) display or other well-known type of display in the art of computer hardware. Accordingly, output device 510 may be a device for displaying a user interface. In addition or alternatively, output device 510 may be a speaker configured to output audible information to the user. In addition or alternatively, output device 510 may be a haptic output device configured to output haptic feedback to the user. Any combination of output devices may be represented by the output device 510.

Communication interface 520 provides the computer system 500 with connectivity to the network 526 or other devices through any compatible communications protocol. Communication interface 520 may send and/or receives data via a wireless or wired transceiver 514. Transceiver 514 may be a cellular frequency, radio frequency (RF), infrared (IR) or any of a number of known wireless or wired transmission systems capable of communicating with other computer devices having some or all of the features of computer system 500. Bus 508 may represent one or more busses, e.g., USB, PCI, ISA (Industry Standard Architecture), X-Bus, EISA (Extended Industry Standard Architecture), CAN bus, or any other appropriate bus and/or bridge (may also be called a bus controller).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings. Various implementations have been specifically described. However, other implementations are also within the scope of this disclosure.

What is claimed is:

1. An electric vehicle charging system comprising:
   an interface configured to:
      receive power from an electric vehicle charging station;
   a power convertor configured to convert the power to a battery chargeable power supply; and
   a controller in communication with the interface and the power convertor, wherein the controller is configured to:
      supply the battery chargeable power supply to a battery;
      monitor the power received from the electric vehicle charging station;
      determine whether a change in voltage of the power received from the electric vehicle charging station is greater than a predetermined voltage change limit;
      when the change in voltage is determined to be greater than the predetermined voltage change limit, adjust a maximum current limit to a predetermined lower current limit value;
      control a current within the electric vehicle charging system to be below the predetermined lower current limit value;
      determine whether a current from the power received from the electric vehicle charging station is greater than the maximum current limit;
      when the current of the power is determined to be greater than the maximum current limit, adjust the current limit to a predetermined lower current limit value; and
      control the current within the electric vehicle charging system to be below the predetermined lower current limit value.

2. The electric vehicle charging system of claim 1, wherein the controller is further configured to:
   transmit, through the interface, a charge state signal to the electric vehicle charging station identifying a charge state of the battery.

3. The electric vehicle charging system of claim 1, wherein the interface is further configured to:
   receive information identifying the maximum current limit from the electric vehicle charging station; and
   receive a charge state signal from the electric vehicle charging station.

4. The electric vehicle charging system of claim 3, wherein the charge state signal identifies at least one of a start session state, a level 1 charging state, a level 2 charging state, or a DC direct charging state.

5. The electric vehicle charging system of claim 1, wherein the predetermined voltage change limit is a voltage drop range between 3-5%.

6. The electric vehicle charging system of claim 1, wherein the controller is configured to control the current within the electric vehicle charging system by adjusting an electronic characteristic of the electric vehicle charging system.

7. The electric vehicle charging system of claim 1, wherein the controller is configured to control the current within the electric vehicle charging system by transmitting, through the interface, a request to lower a current in the power supplied from the electric vehicle charging station.

8. The electric vehicle charging system of claim 7, wherein the controller is further configured to:
   continue monitoring the power received from the electric vehicle charging station; and
   determine whether the current in the power received from the electric vehicle charging station is below the predetermined lower current limit value.

9. The electric vehicle charging system of claim 1, wherein the electric vehicle charging station is configured to monitor a voltage of the power transmitted to the interface, and reduce the maximum current limit to the predetermined lower current limit value when a change in voltage of the power transmitted to the interface is determined to be greater than the predetermined voltage change limit.

10. An electric vehicle charging method comprising:
    receiving, through an interface, power from an electric vehicle charging station;
    supplying the power to a battery;
    monitoring, by a controller, the power received from the electric vehicle charging station;
    determining, by the controller, whether a change in voltage of the power received from the electric vehicle charging station is greater than a predetermined voltage change limit;
    when the change in voltage is determined to be greater than the predetermined voltage change limit, adjusting, by the controller, a maximum current limit to a predetermined lower current limit value;
    controlling, by the controller, a current within an on board charger to be below the predetermined lower current limit value;
    determining whether a current from the power received from the electric vehicle charging station is greater than the maximum current limit;
    when the current of the power is determined to be greater than the maximum current limit, adjusting the current limit to a predetermined lower current limit value; and
    controlling the current within the on board charger to be below the predetermined lower current limit value.

11. The method of claim 10, further comprising:
    transmitting, through an interface, a charge state signal to the electric vehicle charging station identifying a charge state of the battery.

12. The method of claim 10, further comprising:
    receiving information identifying the maximum current limit from the electric vehicle charging station; and
    receiving a charge state signal from the electric vehicle charging station.

13. The method of claim 12, wherein the charge state signal identifies at least one of a start session state, a level 1 charging state, a level 2 charging state, or a DC direct charging state.

14. The method of claim 10, wherein the predetermined voltage change limit is a voltage drop range between 3-5%.

15. The method of claim 10, wherein controlling the current within the on board charger comprises adjusting an electronic characteristic of the on board charger.

16. The method of claim 10, wherein controlling the current within the on board charger comprises transmitting, through an interface, a request to lower a current in the power supplied from the electric vehicle charging station.

17. The method of claim 16, further comprising:
monitoring the power received from the electric vehicle charging station; and
determining whether the current in the power received from the electric vehicle charging station is below the predetermined lower current limit value.

18. The method of claim 10, further comprising:
presenting a message describing a charging performance reduction when the current of the power is determined to be greater than the maximum current limit.

* * * * *